United States Patent
Ikeda et al.

(10) Patent No.: US 6,731,637 B2
(45) Date of Patent: *May 4, 2004

(54) METHOD OF AND AN APPARATUS FOR RELEASING A CUT-THROUGH CONNECTION

(75) Inventors: Hiroshi Ikeda, Tokyo (JP); Kazuhiko Isoyama, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,180

(22) Filed: Aug. 4, 1999

(65) Prior Publication Data

US 2003/0202515 A1 Oct. 30, 2003

(30) Foreign Application Priority Data

Aug. 7, 1998 (JP) .......................................... 10-234882

(51) Int. Cl.⁷ .............................................. H04L 12/28
(52) U.S. Cl. .................................................. 370/395.2
(58) Field of Search ................................ 370/229, 230, 370/235, 395.1, 396, 397, 398, 399, 395.2, 395.52, 400, 409

(56) References Cited

U.S. PATENT DOCUMENTS

| 5,452,295 A | * | 9/1995 | Nakagaki et al. ........ 370/395.2 |
| 5,633,866 A | * | 5/1997 | Callon ........................ 370/397 |
| 5,903,559 A | * | 5/1999 | Acharya et al. ............ 370/355 |
| 6,233,243 B1 | * | 5/2001 | Ganmukhi et al. ......... 370/429 |

FOREIGN PATENT DOCUMENTS

| JP | 6-14050 | 1/1994 |
| JP | 9-172457 | 6/1997 |

* cited by examiner

Primary Examiner—Frank Duong
(74) Attorney, Agent, or Firm—Sughrue Mion, PLLC

(57) ABSTRACT

To provide an apparatus for releasing a cut-through connection in a network node when traffic on the cut-through connection becomes smaller than a fixed value by monitoring traffic of each of cut-through connections established in the network node without charging large load on software processings, the apparatus for releasing a cut-through connection comprises a timer (21) having time counters each assigned to a cut-through connection and outputting a time-out notification signal (20) when a count value of the time counter has attained to a time-out threshold value determined corresponding to the cut-through connection, the time counter being incremented along with time passage and being reset when the cut-through connection is established and when a cell of the cut-through connection arrives to the network node.

7 Claims, 5 Drawing Sheets

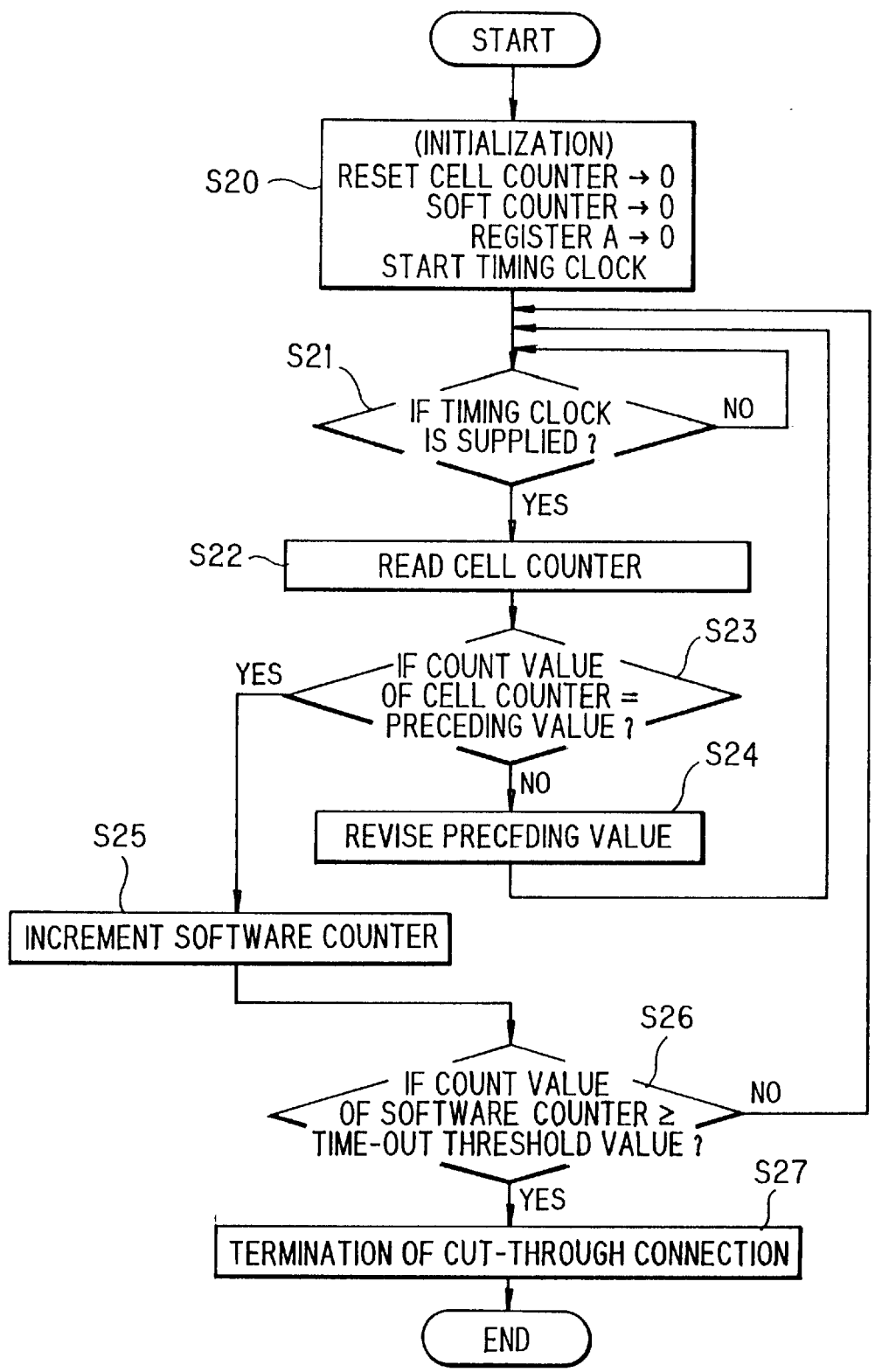

METHOD OF AND AN APPARATUS FOR RELEASING A CUT-THROUGH CONNECTION

BACKGROUND OF THE INVENTION

The present invention relates to a method of and an apparatus for releasing a cut-through connection.

Network services provided for data transmission can be classified into a connection type and a connection-less type.

In the connection-type network service, communication data is transmitted through a communication channel which has been established exclusively between a sender terminal and a receiver terminal according to a telephone number, for example, designated by the sender terminal.

On the other hand, communication data is transmitted being divided into packets, such as IP (Internet Protocol) packets, each added with a header having destination information, in the connection-less-type network service. The packet received by a node of the network is relayed to a next node retrieved by referring to routing information prepared in the node according to the destination information described in the header. Being thus relayed node by node, each packet finally arrives to a destination node which accommodates the receiver terminal of the packet.

In the connection-less-type network service, communication channels between the sender terminal and the receiver terminal can be shared by packets having various destinations, enabling a good use of the network resources.

However, in view of transmission speed, the connection-type network service is advantageous, and substantially the same efficiency of the network resources can be obtained even in the connection-type network service when there are many packets to be transmitted continuously from a specific sender terminal to a specific receiver terminal.

Recently, a network node device called the IP switch is developed, wherein an ATM (Asynchronous Transfer Mode) switch is employed together with an IP controller which takes charge of routing the IP packets by controlling the ATM switch.

In the IP switch, continuous flows of IP packets, such as a flow of multi-media data or burst data, are taken in consideration, and a VC (Virtual Channel) is assigned to each distinct continuous flow of the IP packets, so that ATM cells of the concerning flows can be relayed promptly by way of "cell-switching", that is, can be relayed directly by the ATM switch without reassembled into packet data.

In the IP switch, ATM cells of the IP packet arrived to the node for the first of each continuous flow are reassembled into packet data and transferred to the IP controller. When the IP packet is detected by the IP controller to belong to a continuous flow, such as a flow according to the FTP (File Transfer Protocol) or the HTTP (Hyper Text Transfer Protocol), a VC connection exclusively assigned to the flow is established in the ATM switch for performing a high-speed switching of the ATM cells of the flow, at the cell-level without passing the IP controller. This connection is called the cut-through connection.

The cut-through connection should be released when the concerning flow has been over, that is, when it is detected that any ATM cell of the concerning flow does not arrive for a predetermined time period.

Besides the IP switch, several network node devices, such as those called the LANE (LAN Emulation over ATM), the MPOA (Multi-Protocol Over ATM) or the IPOA (IP Over ATM), are proposed or developed in the ATM Forum or the IETF (Internet Engineering Task Force) by integrating the ATM and the IP technology.

In these network node devices, also, the cut-through connection is established for each continuous flow of the packet traffic, similarly to the IP switch, and established cut-through connections are monitored always individually for releasing them in the absence of their traffic for a certain time period.

For detecting the absence of the packet arrival for a certain period, a traffic monitoring means, which is realized conventionally with software and cell counters for counting cell arrivals on each cut-through connection, has been provided in any of the IP switch, the LANE, the MPOA and the IPOA.

FIG. 5 is a block diagram illustrating a configuration example of a conventional traffic monitoring means for detecting the absence of the cell arrival, and FIG. 6 is a flowchart illustrating operational steps performed in the software for controlling the monitoring means of FIG. 5.

A cell detecting unit 41 detects passage of ATM cells of each cut-through connection, which is notified to a cell counter 42 and the count value of the cell counter 42 is incremented by one with passage of one ATM cell.

In the software implemented in the IP controller, for example, initialization is performed (at step S20 of FIG. 6) when a cut-through connection is newly established. A register A for storing the preceding count value of the cell counter 42 and a soft counter, both provided in the software, are reset to '0', together with the cell counter 42, and a timing clock, which indicates a timing periodically to read out the cell counter 42, is started.

Every time the timing to read out the cell counter 42 arrives (YES at step S21), the count value of the cell counter 42 is read out (at step S22) and compared to the preceding count value of the cell counter 42 stored in the register A (at step S23).

When the count value is not equal to the preceding value, it means that at least one ATM cell of the cut-through connection is arrived and so, the concerning traffic is determined to be flowing normally. The preceding value stored in the register A is revised with the count value newly read out (at step S24), and the operational step returns to S21 for repeating steps S21 to S24.

When the count value of the cell counter 42 is detected to be equal to the preceding value (at step S23), the software counter is incremented by one (at step S25) as no ATM cell has arrived from the preceding read-out timing. Until the software counter counts a threshold value, the operational steps S21 to S26 are repeated. When the count value of the software counter attains to the threshold value, it is determined (at step S27) that the traffic of the corresponding cut-through connection has terminated, and the concerning cut-through connection is released.

However, a problem of the conventional traffic monitoring means as above described is that there must be performed many software processings, such as reading out the cell counter 42 (step S22), comparing the count value to the preceding value (steps S23 and S24), or revising the software counter (step S25). Therefore, when the number of established cut-through connections becomes large, load of the software to be executed in the IP controller, for example, becomes too much increased.

Another problem of the conventional traffic monitoring means is that a large memory space is required because the software counter and the register A should be provided for each cut-through connection.

SUMMARY OF THE INVENTION

Therefore, a primary object of the present invention is to provide a method of and an apparatus for releasing a cut-through connection which is applicable to such network node devices and able to reduce load to be charged on software processings.

In order to achieve the object, in an apparatus according to an aspect of the invention for releasing a cut-through connection in a network node when traffic on the cut-through connection becomes smaller than a fixed value by monitoring traffic of each of cut-through connections established in the network node, there are comprised:

- a timer having a time counter assigned to the cut-through connection and outputting a time-out notification signal when a count value of the time counter has attained to a time-out threshold value determined corresponding to the cut-through connection, the time counter being incremented along with time passage and being reset when the cut-through connection is established and when a cell of the cut-through connection arrives to the network node;
- a time-out threshold memory wherein the time-out threshold value is registered;
- a connection-release control unit for controlling a cell processing unit to release the cut-through connection according to the time-out notification signal; and
- a connection-release message generator for transmitting a connection-release requesting message of the cut-through connection towards a next node according to the time-out notification signal.

Therefore, the load to the control software for detecting traffic termination of the cut-through connections can be far reduced according to the invention in comparison with the conventional method.

An apparatus according to a second aspect of the invention comprises:

- a timer having an up/down counter assigned to the cut-through connection and outputting a time-out notification signal when a count value of the up/down counter has attained to a time-out threshold value determined corresponding to the cut-through connection, the up/down counter being reset when the cut-through connection is established, being incremented according to clock pulses having a cell cycle predetermined for the cut-through connection and being decremented when a cell of the cut-through connection arrives to the network node;
- a time-out threshold memory wherein the time-out threshold value is registered;
- a cycle-clock generator for generating the clock pulses referring to a value of the cell cycle which is registered in a cell-cycle memory corresponding to the cut-through connection;
- a connection-release control unit for controlling a cell processing unit to releasing the cut-through connection according to the time-out notification signal; and
- a connection-release message generator for transmitting a connection-release requesting message of the cut-through connection towards a next node according to the time-out notification signal.

According to the second aspect, the time-out notification signal can be generated even when the average cell arrival cycle of a cut-through connection remains longer than a predetermined cell cycle for a certain time period. Therefore, also the cut-through connection whereof cell traffic has become too small can be released efficiently.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 6 is a flowchart illustrating operational steps performed in the software for controlling the monitoring means of FIG. 5.

DETAILED DESCRIPTION OF THE PREFERRED EMBODIMENTS

Now, embodiments of the present invention will be described in connection with the drawings.

Figure 1:
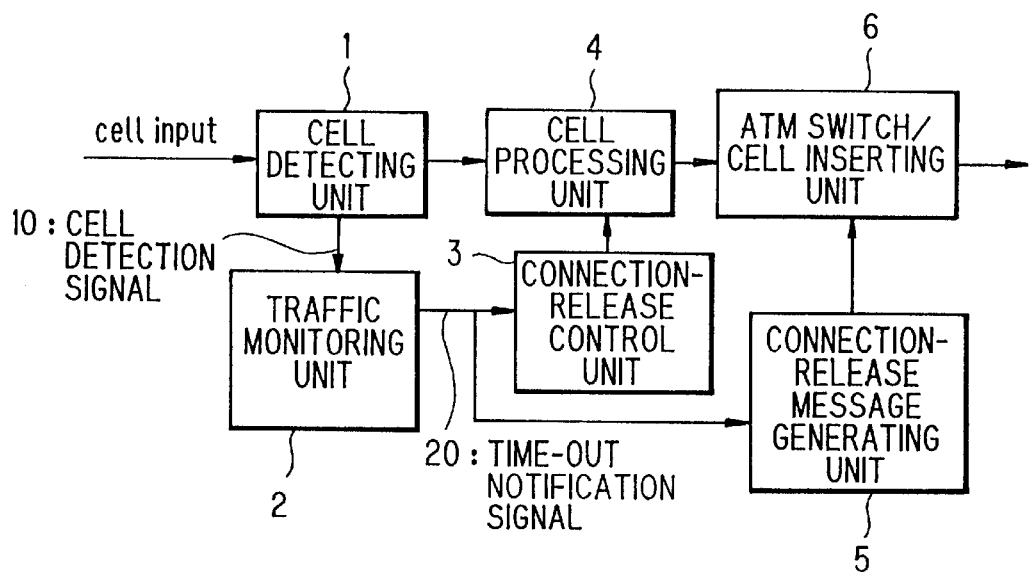
FIG. 1 is a block diagram illustrating a connection releasing circuit according to an embodiment of the invention.

FIG. 1 is a block diagram illustrating a connection releasing circuit according to an embodiment of the invention to be applied to a network node device. The connection releasing circuit of FIG. 1 comprises a cell detecting unit 1, a traffic monitoring unit 2, a connection-release control unit 3, a cell processing unit 4, a connection-release message generating unit 5 and an ATM switch 6. The ATM switch 6 may be replaced by a cell inserting unit 6, when the node device has only one output port to be connected to a next node. In the following description, they are represented by the ATM switch 6.

The cell detecting unit 1 transfers input cells to the cell processing unit 4 and outputs a cell detection signal 10 to the traffic monitoring unit 2 by detecting arrival of each cell.

In the cell detection signal 10, there is included information concerning a corresponding connection identifier such as VPI/VCI (Virtual Path Identifier/Virtual Channel Identifier) of the detected cell.

The traffic monitoring unit 2 outputs a time-out notification signal 20 to the connection-release control unit 3 and the connection-release message generating unit 5 when the cell detection signal 10 of a specific cut-through connection already established is not outputted from the cell detecting unit 1 during a certain time period.

The time-out notification signal 20 also includes information concerning corresponding connection identifier, the VPI/VCI, for example, of the cut-through connection as well as the cell detection signal 10.

Receiving the time-out notification signal 20, the connection-release control unit 3 controls the cell processing unit 4 to release a cut-through connection specified by the connection identifier included in the time-out notification signal 20 among the connections actually established.

The cell processing unit 4 takes charge of performing cell processings of the input cells, such as control of cell transfer and cell rejection, header conversion, or appending interior routing information to be used in the node device, when connections (including cut-through connections) are established, referring to connection information such as data prepared by the control software of the node device in the header conversion table or in the UPC (User Parameter Control) table, and takes charge of releasing a concerning cut-through connection by clearing the corresponding connection information when controlled by the connection-release control unit 3.

The connection-release message generating unit 5 generates a connection-release message according to the time-out notification signal 20 supplied from the traffic monitoring unit 2. The connection-release message is segmented into cells and switched/inserted into cells to be transmitted to the next node by the ATM switch 6.

The ATM switch 6 (or the cell inserting unit 6) outputs cells supplied from the cell processing unit 4 and from the connection-release message generating unit 5 after rearranging them according to the interior routing information.

Figure 2:
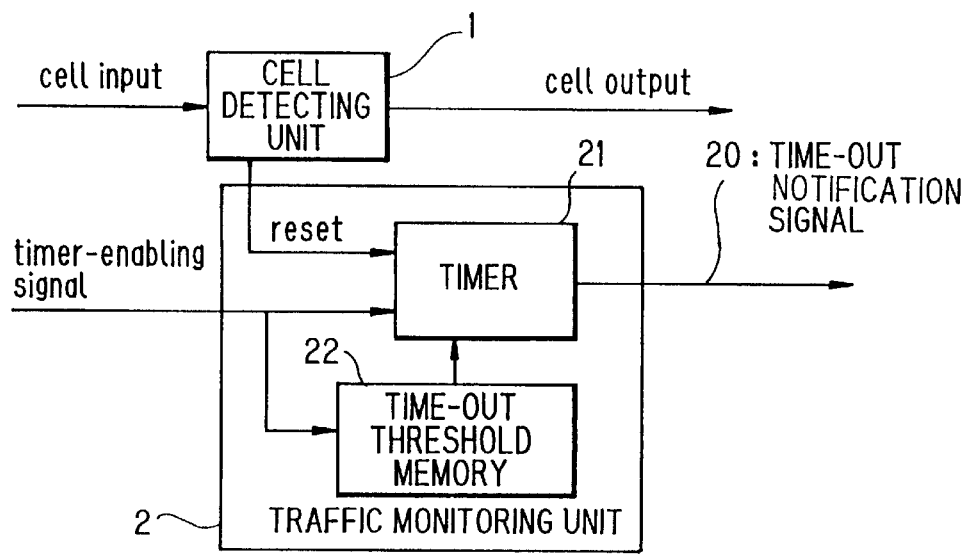
FIG. 2 is a block diagram illustrating inner configuration of a traffic monitoring unit 2 of FIG. 1.

FIG. 2 is a block diagram illustrating inner configuration of the traffic monitoring unit 2 of FIG. 1, comprising a timer 21 and a time-out threshold memory 22. The timer 21 has a plurality of time counters, and the time-out threshold memory 22 stores time-out threshold values each corresponding to each of the cut-through connections, respectively.

With a timer-enabling signal, one of the time counters is assigned to a cut-through connection and starts time counting. When the cell detection signal 10 is supplied from the cell detecting unit 1, a corresponding time counter is reset, and when the count value of a time counter attains to its time-out threshold value, the time-out notification signal 20 is outputted together with the connection identifier corresponding to the concerning time counter.

Figure 3:
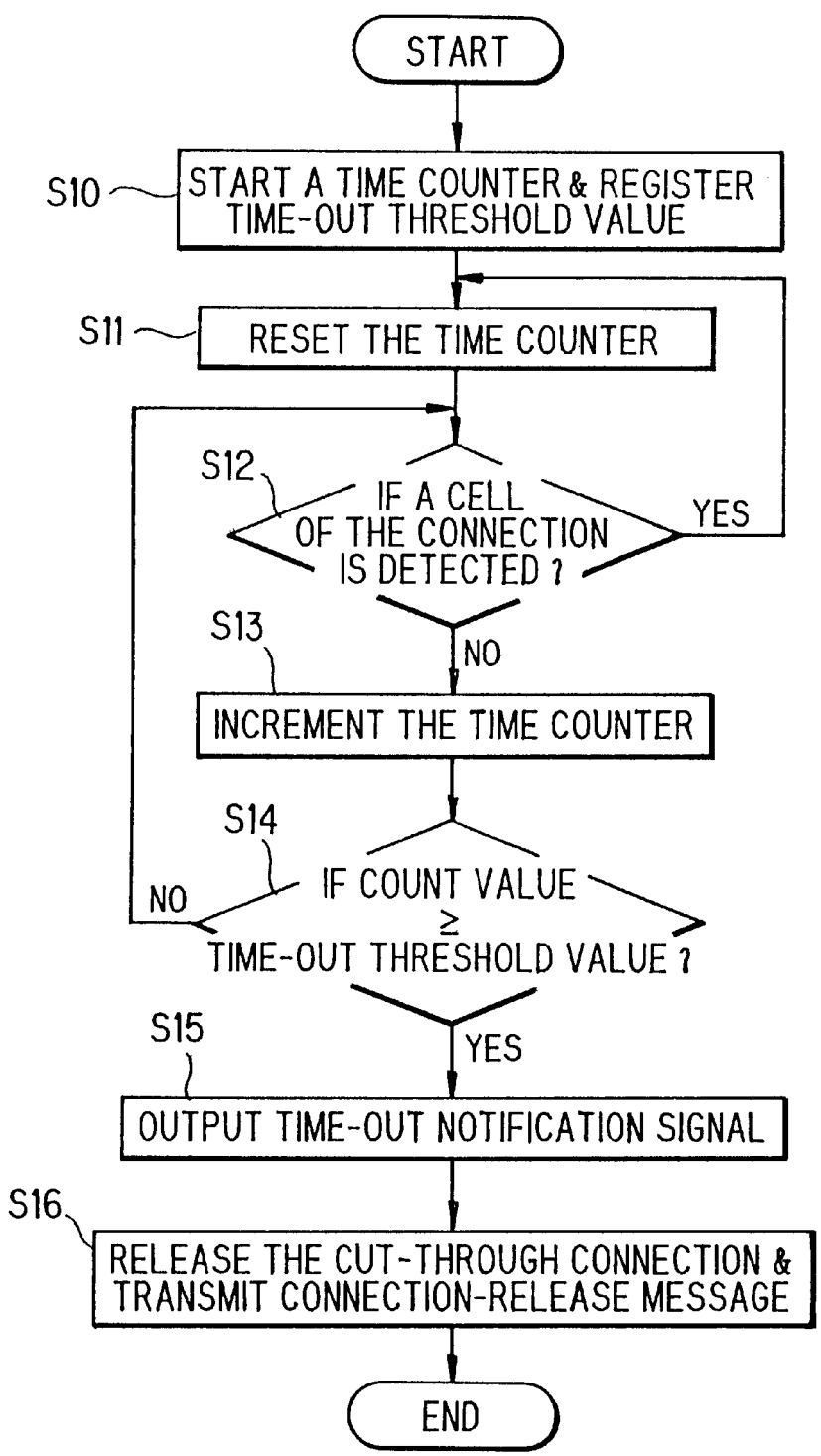
FIG. 3 is a flowchart illustrating operational steps of the connection release circuit of FIG. 1.

FIG. 3 is a flowchart illustrating operational steps of the connection release circuit of FIG. 1.

Now, operation of the connection release circuit of FIG. 1 will be described referring to FIGS. 1 to 3.

When a cut-through connection is established, a timer-enabling signal is supplied from the control software, with which a time counter in the timer 21 is started (at step S10) and reset (at step S11), and a time-out threshold value for the time counter is registered in the time-out threshold memory 22. The time-out threshold value may be unique for all the time counters, or all the time-out threshold values may be preset when the node device is initialized. Here, the time-out threshold value is described to be distinct for each cut-through connection and to be registered when the cut-through connection is established by the control software.

Every time when arrival of a cell of the corresponding connection is detected (YES at step S12) by the cell detecting unit 1, the time counter is reset by the cell detection signal 10 outputted with the concerning connection identifier by repeating steps S11 and S12.

When no cell of the corresponding connection arrives for one cycle of a timing clock (NO at step S12), the concerning time counter is incremented (at step S13) and checked whether the count value has attained to the corresponding time-out threshold value registered in the time-out threshold memory 22.

In case the count value remains smaller than its time-out threshold value (NO at step S14), the operational step returns to step S12 to repeat steps S11 to S14. When the count value is found to be equal to the time-out threshold value (YES at step S14), a time-out notification signal 20 including concerning connection information is outputted (at step S15). According to the time-out notification signal 20, the concerning cut-through connection is released by the connection-release control unit 3 and a connection-release message is transmitted from the connection-release message generating unit 5.

As heretofore described, the index for determining whether the time-out has arrived or not can be obtained at steps S11 to S13 in the flowchart of FIG. 3, while steps S21 to S25 must be performed by software processings in the flowchart of FIG. 6, conventionally, for obtaining the same index. Thus, the load to the control software for detecting traffic termination of the cut-through connections can be far reduced in the connection release method according to the embodiment in comparison with the conventional method of FIG. 6.

Figure 4:
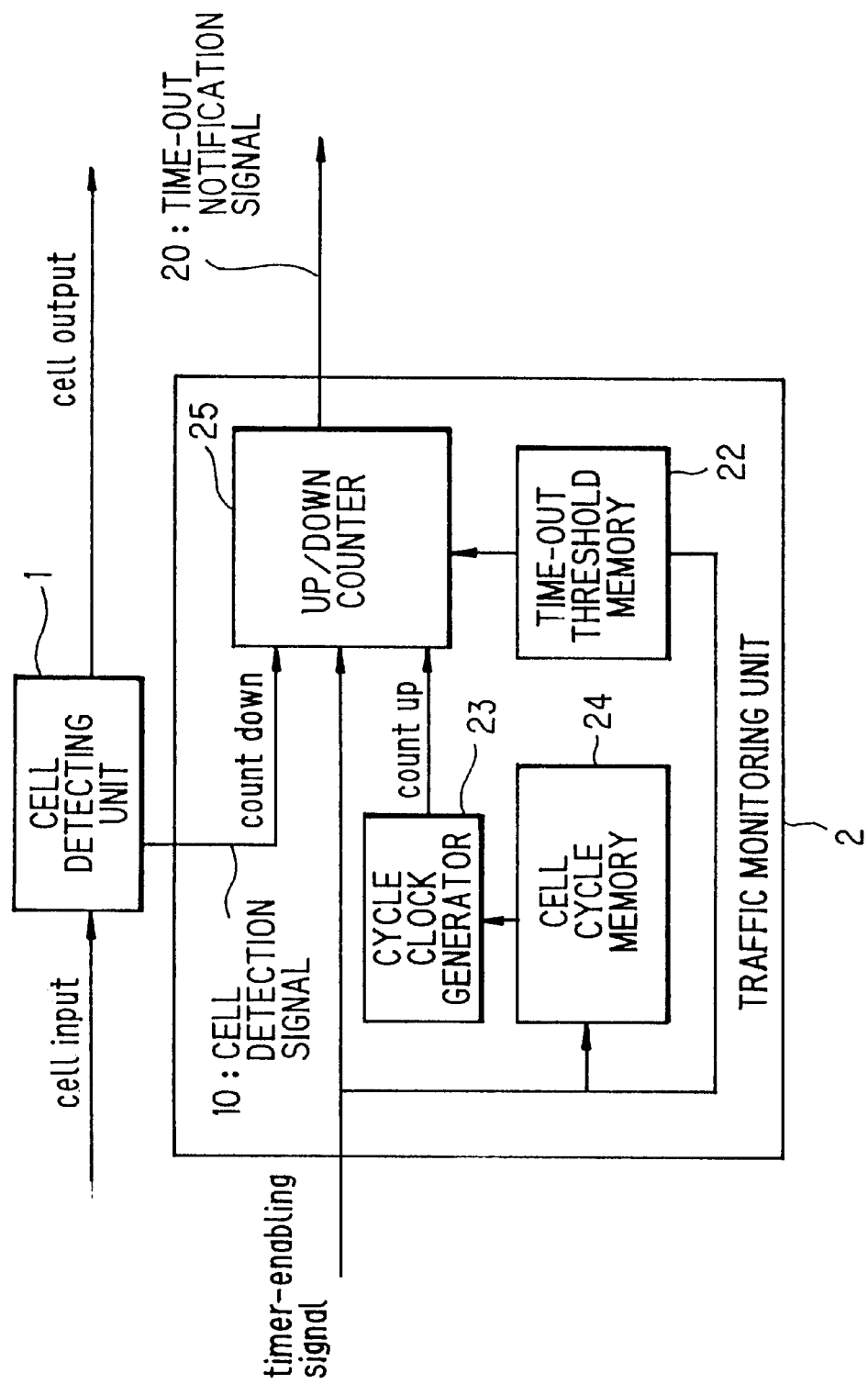
FIG. 4 is a block diagram illustrating another configuration example of the traffic monitoring unit 2 of FIG. 1.
Figure 5:
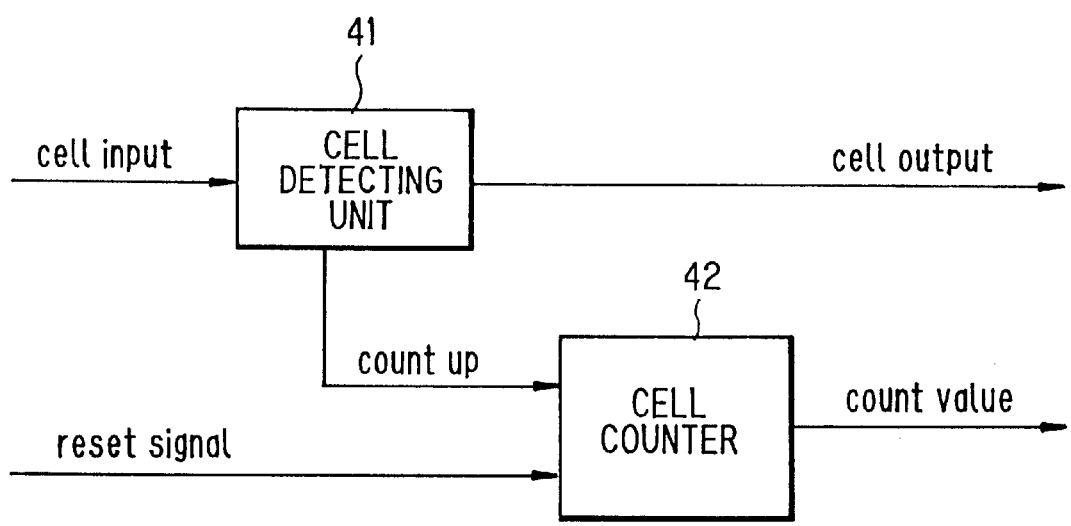
FIG. 5 is a block diagram illustrating a configuration example of a conventional traffic monitoring means for detecting the absence of the cell arrival.

FIG. 4 is a block diagram illustrating another configuration example of the traffic monitoring unit 2 of FIG. 1.

In the traffic monitoring unit of FIG. 3, the timer 21 of FIG. 2 is replaced with a set of up/down counters 25, and a set of cycle-clock generators 23 and a cell cycle memory 24 are further provided.

When a cut-through connection is newly established, one of the up/down counters 25 and one of the cycle-clock generators 23 are assigned to the concerning cut-through connection, and a corresponding cell cycle, with which the concerning cycle-clock generator outputs clock pulses, is determined in consideration of minimum cell traffic valuable for maintaining the concerning cut-through connection, and registered in the cell cycle memory 24.

The concerning one of the up/down counters 25 is incremented according to the clock pulses generated by corresponding one of the cycle-clock generators 23, and decremented according to the cell detection signal 10 of the cut-through connection.

When the count value of one of the up/down counters 25 attains to its time-out threshold value registered in the time-out threshold memory 22, the time-out notification signal 20 is outputted together with the connection identifier.

In the traffic monitoring unit 2 of FIG. 2, the time-out notification signal 20 is generated on condition that there occurs no cell arrival for a certain time period. On the other hand, the time-out notification signal 20 is generated, in the traffic monitoring unit 2 of FIG. 4, even when the average cell arrival cycle of a cut-through connection remains for a certain time period to be longer than a predetermined cell cycle. Therefore, the cut-through connection, whereof cell traffic has become too small, can be released efficiently.

Heretofore, the embodiments of the invention are described to be employed for monitoring the traffic flow of ATM cells. However, application of the present invention is not limited to the ATM cells. It can be easily understood that the traffic monitoring unit 2 of FIG. 2 or FIG. 4 is applicable for monitoring traffic of layer-3 packets or layer-2 frames in the router, the layer-3 switch or the layer-2 switch, for example.

What is claimed is:

1. An apparatus for releasing a cut-through connection in a network node when traffic on the cut-through connection becomes smaller than a fixed value by monitoring traffic of each of cut-through connections established in the network node; the apparatus comprising:

a timer having an up/down counter assigned to the cut-through connection and outputting a time-out notification signal when a count value of the up/down counter has attained to a time-out threshold value determined corresponding to the cut-through connection, the up/down counter being reset when the cut-through connection is established, being incremented according to clock pulses having a cell cycle predetermined for the cut-through connection and being decremented when a cell of the cut-through connection arrives to the network node;

a connection-release control unit for controlling a cell processing unit to release the cut-through connection according to the time-out notification signal; and a connection-release message generator for transmitting a connection-release requesting message of the cut-through connection towards a next node according to the time-out notification signal.

2. An apparatus for releasing a cut-through connection in a net-work node when traffic on the cut-through connection becomes smaller than a fixed value by monitoring traffic of each of cut-through connections established in the network node; the apparatus comprising:

a timer having a time counter assigned to the cut-through connection and outputting a time-out notification signal when a count value of the time counter has attained to a time-out threshold value determined corresponding to the cut-through connection, the time counter being incremented along with time passage and being reset when the cut-through connection is established and when a cell of the cut-through connection arrives to the network node;

a connection-release control unit for controlling a cell processing unit to release the cut-through connection according to the time-out notification signal; and a connection-release message generator for transmitting a connection-release requesting message of the cut-through connection towards a next node according to the time-out notification signal.

3. An apparatus as recited in claim 2, wherein the time-out threshold value is registered in a time-out threshold memory.

4. An apparatus for releasing a cut-through connection in a net-work node when traffic on the cut-through connection becomes smaller than a fixed value by monitoring traffic of each of cut-through connections established in the network node; the apparatus comprising:

a timer having an up/down counter assigned to the cut-through connection and outputting a time-out notification signal when a count value of the up/down counter has attained to a time-out threshold value determined corresponding to the cut-through connection, the up/down counter being reset when the cut-through connection is established, being incremented according to clock pulses having a cell cycle predetermined for the cut-through connection and being decremented by one when a cell of the cut-through connection arrives to the network node.

5. An apparatus as recited in claim 4, wherein the clock pulses are generated by a cycle-clock generator referring to a value of the cell cycle which is registered in a cell-cycle memory corresponding to the cut-through connection.

6. An apparatus as recited in claim 4, wherein the time-out threshold value is registered in a time-out threshold memory.

7. A method of releasing a cut-through connection in a network node when traffic on the cut-through connection becomes smaller than a fixed value by monitoring traffic of each of cut-through connections established in the network node; the method comprising steps of: assigning and resetting an up/down counter for a cut-through connection and registering a time-out threshold value for the up/down counter when the cut-through connection is established;

incrementing the up/clown counter according to clock pulses having a cell cycle predetermined for the cut-through connection; decrementing by one the up/down counter when a cell of the cut-through connection arrives to the network node; and outputting a time-out notification signal when a count value of the time counter has attained to the time-out threshold value.

* * * * *

UNITED STATES PATENT AND TRADEMARK OFFICE
CERTIFICATE OF CORRECTION

PATENT NO. : 6,731,637 B2
DATED : May 4, 2004
INVENTOR(S) : Hiroshi Ikeda and Kazuhiko Isoyama It is certified that error appears in the above-identified patent and that said Letters Patent is hereby corrected as shown below:

Column 6,
Line 65, "node;" has been replaced with -- node, --;

Column 7,
Lines 21 and 30, "node;" has been replaced with -- node, --;

Column 8,
Lines 5 and 35, "node;" has been replaced with -- node, --;
Line 37, "time counter" has been replaced with -- up/down counter --.

Signed and Sealed this

Seventeenth Day of August, 2004

JON W. DUDAS
*Acting Director of the United States Patent and Trademark Office*